(12) United States Patent
Thodal et al.

(10) Patent No.: US 12,535,010 B2
(45) Date of Patent: Jan. 27, 2026

(54) COMPACT BLADE PITCH MECHANISM AND AIRCRAFT USING SAME

(71) Applicant: Joby Aero, Inc., Santa Cruz, CA (US)

(72) Inventors: Rob Thodal, Santa Cruz, CA (US); Baixi Pei, Newark, CA (US); Joachim L. Grenestedt, Hellertown, PA (US); Mallory Snowden, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 18/731,044

(22) Filed: May 31, 2024

(65) Prior Publication Data

US 2024/0418093 A1     Dec. 19, 2024

Related U.S. Application Data

(60) Provisional application No. 63/521,808, filed on Jun. 19, 2023.

(51) Int. Cl.
    *F01D 7/00*           (2006.01)
    *B64C 11/32*         (2006.01)
    *B64C 11/44*         (2006.01)

(52) U.S. Cl.
CPC ............... *F01D 7/00* (2013.01); *B64C 11/32* (2013.01); *B64C 11/44* (2013.01); *F05D 2260/56* (2013.01); *F05D 2260/70* (2013.01)

(58) Field of Classification Search
CPC ... B64C 27/605; B64C 29/0033; B64C 11/32; B64C 11/28; B64C 27/59; B64C 11/06; B64C 27/48; B64C 27/32; B64C 27/72; B64C 11/30; B64C 11/44; B64C 27/50; B64C 2027/7216; B64C 11/34; B64C 2027/7255; B64C 2027/7205; B64C 2027/8236; B64C 27/025; B64C 29/0025; F01D 7/00; B64U 50/19; B64U 30/29; B64U 10/14; B64U 20/50; B64U 30/297; B64U 70/80; B64D 35/00; F04D 29/362; F05D 2220/329; F05D 2220/90; F05D 2260/56; F05D 2260/70

See application file for complete search history.

(56) References Cited

U.S. PATENT DOCUMENTS

| | | | |
|---|---|---|---|
| 9,169,735 B2 * | 10/2015 | Stamps | B64C 11/06 |
| 9,657,582 B2 * | 5/2017 | Haldeman | B64C 29/0033 |
| 10,618,641 B2 * | 4/2020 | Uebori | B64C 27/006 |
| 11,560,224 B2 * | 1/2023 | Cox | B64C 27/605 |
| 11,597,506 B2 * | 3/2023 | Clarke | B64C 27/80 |

(Continued)

*Primary Examiner* — Eric J Zamora Alvarez
(74) *Attorney, Agent, or Firm* — Michael A. Guth

(57) ABSTRACT

A propeller blade pitch control mechanism configured to adjust and control the blade pitch of the blades of a multi-blade propeller simultaneously. The pitch control mechanism may have a pitch plate which is raised or lowered along a liner path along an axial direction using a linear drive, which may be a power screw. The pitch plate is coupled to the blade roots with kinematic links which transfer the linear axial motion of the pitch plate along the propeller spin axis into rotary motion of the propeller blade roots, thereby controlling the pitch of the propeller blades. The propeller pitch control mechanism may include springs or gas springs adapted to place the propeller blades in a low drag position in the event of failure of the blade pitch control mechanism.

10 Claims, 16 Drawing Sheets

(56) References Cited

U.S. PATENT DOCUMENTS

| | | | |
|---|---|---|---|
| 2005/0132830 A1* | 6/2005 | Gerbier | F16H 25/2252 |
| | | | 74/89.23 |
| 2013/0136596 A1 | 5/2013 | Stamps | |
| 2014/0231188 A1* | 8/2014 | Prouzet | F16D 55/2245 |
| | | | 188/72.3 |
| 2015/0086358 A1 | 3/2015 | Filter | |
| 2016/0257399 A1* | 9/2016 | Carter, Jr. | B64C 27/59 |
| 2017/0144746 A1* | 5/2017 | Schank | B64D 27/20 |
| 2018/0155019 A1 | 6/2018 | Lee et al. | |
| 2019/0002085 A1* | 1/2019 | Choi | B64C 27/51 |
| 2019/0016441 A1 | 1/2019 | Schank et al. | |
| 2019/0161179 A1 | 5/2019 | Uebori et al. | |
| 2020/0317330 A1* | 10/2020 | Clarke | B64C 27/80 |
| 2021/0001974 A1* | 1/2021 | Kunii | B64C 11/34 |
| 2022/0194554 A1 | 6/2022 | Choi et al. | |

\* cited by examiner

COMPACT BLADE PITCH MECHANISM AND AIRCRAFT USING SAME

CROSS-REFERENCE TO RELATED APPLICATIONS

This application claims priority to U.S. Provisional Patent Application No. 63/521,808 to Thodal et al., filed Jun. 19, 2023, which is hereby incorporated by reference in its entirety.

FIELD OF THE INVENTION

This invention relates to the aviation field, namely a blade pitch control mechanism used on aerial vehicles.

SUMMARY

A propeller blade pitch control mechanism configured to adjust and control the blade pitch of the blades of a multi-blade propeller simultaneously. The pitch control mechanism may have a pitch plate which is raised or lowered along a liner path along an axial direction using a linear drive, which may be a power screw. The pitch plate is coupled to the blade roots with kinematic links which transfer the linear axial motion of the pitch plate along the propeller spin axis into rotary motion of the propeller blade roots, thereby controlling the pitch of the propeller blades. The propeller pitch control mechanism may include springs or gas springs adapted to place the propeller blades in a low drag position in the event of failure of the blade pitch control mechanism.

DETAILED DESCRIPTION

Control of the pitch angle of the blades of a propeller can be very important during the operation of an aircraft. It may be even more important in the case of a vertical take-off and landing (VTOL) aircraft, where there may be significantly more thrust needed during hover operations. Although the requisite thrust distribution for hover operations may be maintained at least in part by moderating the rotational speed of the rotor assemblies, the blade pitch angle may also be part of the operational paradigm. Further, it is likely that the propeller blade pitch angle range used during the hover mode of VTOL operations may be a different range than the propeller blade pitch angle range used during nominal forward flight operations.

In some embodiments of the present invention, a propeller blade pitch angle control mechanism provides a compact, redundant, and reliable device adapted to control and alter the pitch angle of a plurality of propeller blades of an aircraft. In some aspects, the pitch angle of all of the propeller blades of a propeller is altered simultaneously. In some aspects, the pitch angle of all of the propeller blades of a propeller is altered with the use of a single actuation device, which may be a power screw.

Figure 1:
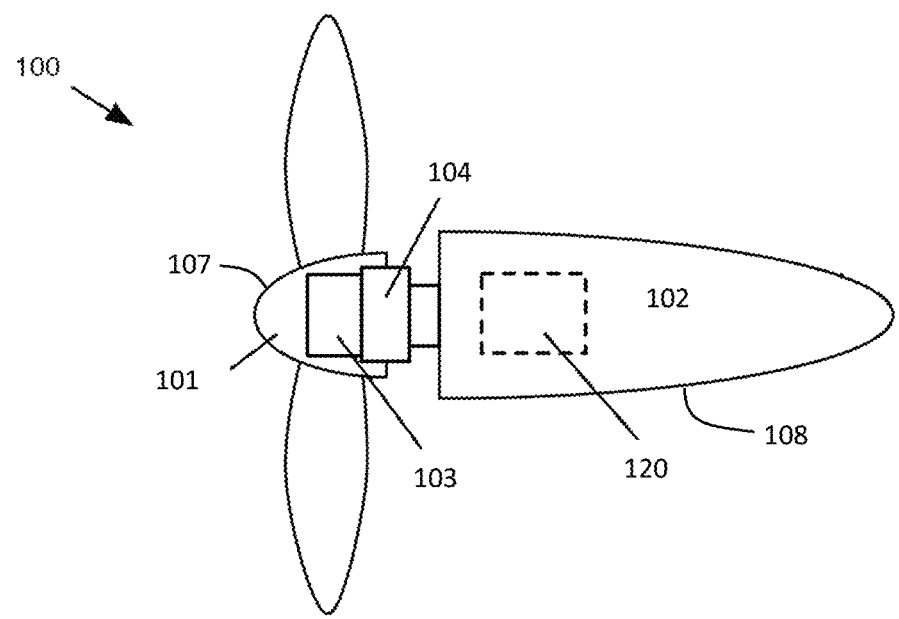
FIG. 1 is a sketch of a propulsion system according to some embodiments of the present invention.

FIG. 1 illustrates a representative aircraft propulsion system 100 which includes: a rotor 101, a nacelle 102, a propeller hub 103, and a drive motor with an external motor rotor 104. The rotor includes a set of blades coupled to the hub 103 and may include a cowling, or spinner 107. The nacelle 102 defines an outer surface 108. The drive mechanism includes a rotary portion 104 rigidly coupled to the hub 103, and a fixed portion coupled to the nacelle. The system 100 can optionally include: a tilt mechanism housed at least partially in the nacelle, a power supply, and any other suitable components. The aircraft propulsion system can be used in conjunction with a rotorcraft. The rotorcraft is preferably a tiltrotor aircraft with a plurality of aircraft propulsion systems (e.g., rotor assemblies, rotor systems, etc.), operable between a forward arrangement and a hover arrangement. However, the rotorcraft can alternatively be a fixed wing aircraft with one or more rotor assemblies, and/or any other suitable rotorcraft or vehicle propelled by rotors. The rotorcraft preferably includes an all-electric powertrain (e.g., battery or hydrogen fuel cell powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

The term "rotor" as utilized herein, in relation to the aircraft propulsion system or otherwise, can refer to a rotor, a propeller, and/or any other suitable rotary aerodynamic actuator. While a rotor can refer to a rotary aerodynamic propulsor that makes use of an articulated or semi-rigid hub (e.g., wherein the connection of the blades to the hub can be articulated, flexible, rigid, and/or otherwise connected), and a propeller can refer to a rotary aerodynamic propulsor that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

As shown in FIG. 1, the aircraft propulsion system 100 includes: a rotor, a nacelle, and a drive mechanism coupled to the rotor and the nacelle. The rotor includes a set of blades coupled to a hub. The nacelle defines an outer surface and an interior. The drive mechanism includes a rotary portion rigidly coupled to the hub, and a fixed portion coupled to the nacelle. The system 100 can optionally include: a tilt mechanism housed at least partially in the interior of the nacelle, a power supply, and any other suitable components. The rotor functions to rotate in a fluid under the power of the drive mechanism in order to provide thrust (e.g., to an attached aircraft). The rotor includes a set of blades coupled to a hub, and a cowling, or spinner, that at least partially encloses the hub.

The set of blades convert rotational motion to axial thrust, resulting in at least a portion of the fluid having axial momentum (e.g., to provide thrust). The rotor can have any suitable number of blades; the rotor has five blades in an illustrative embodiment, but can alternatively have three blades, four blades, six blades, and any other suitable number of blades. In a specific example, the rotor includes five variable-pitch blades; in alternative examples, the rotor can have any suitable number of blades having variable pitch.

The rotor blades are preferably unconstrained at the blade tips (e.g., by any sort of physical structure), but the rotor can additionally or alternatively include a fairing that encloses the blade tips (e.g., such as the duct of a ducted fan). In such variations, the fairing can function to dampen the acoustic signature components (e.g., acoustic waves) that originate from the blade tips during rotation. However, the rotor blades can additionally or alternatively be constrained or unconstrained in any suitable manner.

The hub functions to mutually couple the set of blades and provide a region at which the rotor couples to the drive mechanism and receives rotary power therefrom. In some aspects, the motor is an outrunner electric motor, and the hub is structurally coupled to a forward surface of the rotor of the electric motor.

The lumen functions to define a volume 120 that retains components of the aircraft propulsion system and/or other aircraft subsystems. Such retained components can include, in variations, at least a portion of a tilt mechanism, all or a portion of the power supply, power delivery subsystems (e.g., electrical power distribution cables, conduits, etc.), mechanical actuators (e.g., for actuating blade pitch or rotor tilt), all or a portion of the drive mechanism, and any other suitable components.

In some aspects, an aerial vehicle may use bladed propellers powered by electric motors to provide thrust during take-off. The propeller/motor units may be referred to as rotor assemblies. In some aspects, the wings of the aerial vehicle may rotate, with the leading edges facing upwards, such that the propellers provide vertical thrust for take-off and landing. In some aspects, the motor driven propeller units on the wings may themselves rotate relative to a fixed wing, such that the propellers provide vertical thrust for take-off and landing. The rotation of the motor driven propeller units may allow for directional change of thrust by rotating both the propeller and the electric motor, thus not requiring any gimbaling, or other method, of torque drive around or through a rotating joint.

In some aspects, aerial vehicles according to embodiments of the present invention take off from the ground with vertical thrust from rotor assemblies that have deployed into a vertical configuration. As the aerial vehicle begins to gain altitude, the rotor assemblies may begin to be tilted forward in order to begin forward acceleration. As the aerial vehicle gains forward speed, airflow over the wings results in lift, such that the rotors become unnecessary for maintaining altitude using vertical thrust. Once the aerial vehicle has reached sufficient forward speed, some or all of the blades used for providing vertical thrust during take-off may be stowed along their nacelles. In some aspects, all rotor assemblies used for vertical take-off and landing are also used during forward flight. The nacelle supporting the rotor assemblies may have recesses such that the blades may nest into the recesses, greatly reducing the drag of the disengaged rotor assemblies.

After take-off, the aerial vehicle will begin a transition to forward flight by articulating the rotors from a vertical thrust orientation to a position which includes a horizontal thrust element. As the aerial vehicle begins to move forward with speed, lift will be generated by the wings, thus requiring less vertical thrust form the rotors. As the rotors are articulated further towards the forward flight, horizontal thrust, configuration, the aerial vehicle gains more speed.

The electric motor/propeller combination being on the deployable side of the articulating joint allows for a rigid mounting of the propeller to the motor, which is maintained even as the propeller is moved through various attitudes relative to the rear nacelle portion. With such a configuration the rotating power from the motor need not be gimbaled or otherwise transferred across a rotating joint. The deployment is of the entire motor driven rotor assembly in some aspects.

Figure 2A:
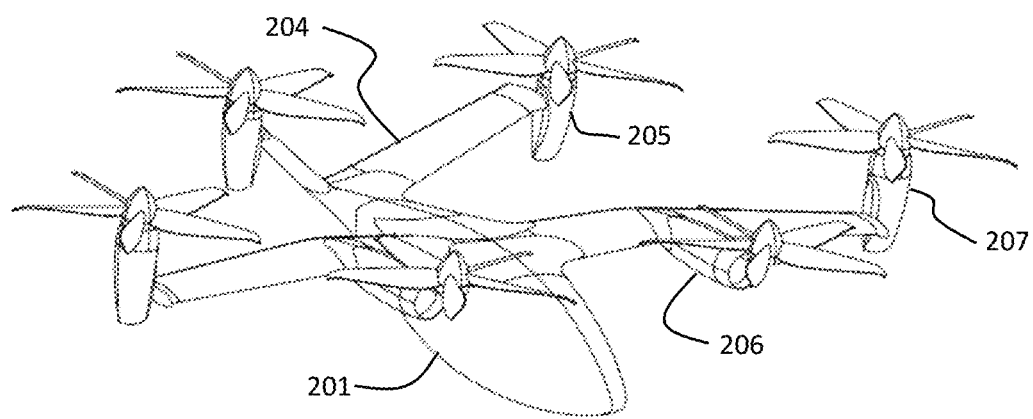
FIG. 2A is a vertical take-off and landing aircraft in a take-off configuration according to some embodiments of the present invention.
Figure 2B:
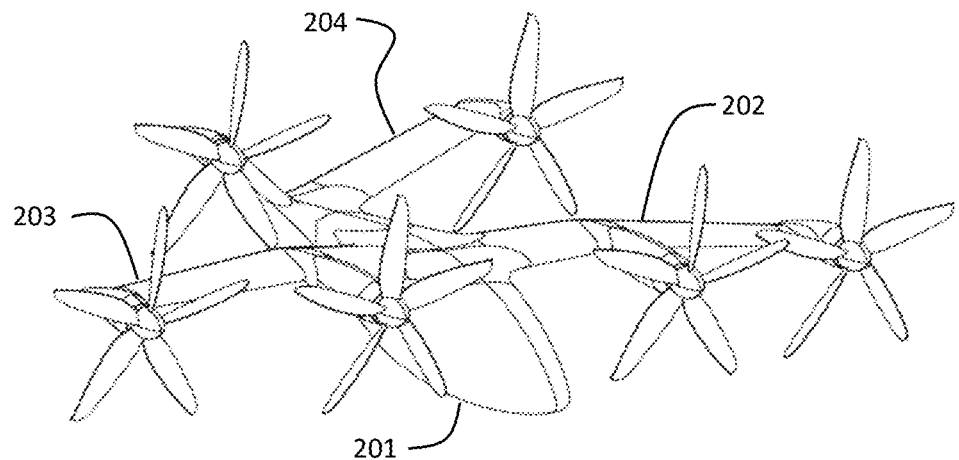
FIG. 2B is a vertical take-off and landing aircraft in a forward flight configuration according to some embodiments of the present invention.

In a first configuration according to some embodiments of the present invention, as seen in a vertical take-off configuration in FIG. 2A and in a forward flight configuration in FIG. 2B, an aerial vehicle 200 uses fixed wings 202, 203, which may be forward swept wings, with rotors of the same or different types adapted for both vertical take-off and landing and for forward flight. The aircraft body 201 supports a left wing 202 and a right wing 203. Motor driven rotor assemblies 206, 207 on the wings include propellers which may stow and nest into the nacelle body. The aircraft body 201 extends rearward is also attached to raised rear stabilizers 204. The rear stabilizers have rear rotor assemblies 205 attached thereto. Although five seats are anticipated, other numbers of passengers and/or total occupants may be accommodated in differing embodiments of the present invention.

In some aspects, all or a portion of the wing mounted rotors may be adapted to be used in a forward flight configuration, while other wing mounted rotors may be adapted to be fully stowed during regular, forward, flight. The aerial vehicle 200 may have two rotors on the right wing 203 and two rotors on the left wing 202. The inboard rotor assemblies on each wing may have wing mounted rotors 206 that are adapted to flip up into a deployed position for vertical take-off and landing, to be moved back towards a stowed position during transition to forward flight, and then to have their blades stowed, and nested, during forward flight. The outboard rotor assembly 207 may pivot from a horizontal to a vertical thrust configuration. It is to be understood that is some flight modes the rotor assemblies may not be tilting in perfect unison, as differential tilt is used for yaw control, for example.

Similarly, each rear stabilizer 204 may have rotor units mounted to it, both of which are adapted to be used during vertical take-off and landing, and transition, modes. In some aspects, all of the rotor designs are the same, with a subset used with their main blades for forward flight. In some aspects, all of the rotor designs are the same, with all rotors used for forward flight. In some aspects, there may be a different number of rotor units mounted to the rear stabilizer 204.

In some embodiments, the electric motors of the aerial vehicle are powered by rechargeable batteries. The use of multiple batteries driving one or more power busses enhances reliability, in the case of a single battery failure. In some embodiments, the batteries may be spread out along the rotating portion, and there may be one battery for each of the motor/ducted fan assemblies. In some embodiments, the battery or batteries may reside in part or fully within the aircraft body, with power routed out to the motors through the rotational couplings. In some embodiments, the batteries reside within the vehicle body on a rack with adjustable position such that the vehicle balance may be adjusted depending upon the weight of the pilot. In some embodiments, the electric motors of the aerial vehicle are powered by hydrogen powered fuel cells.

Figure 3A:
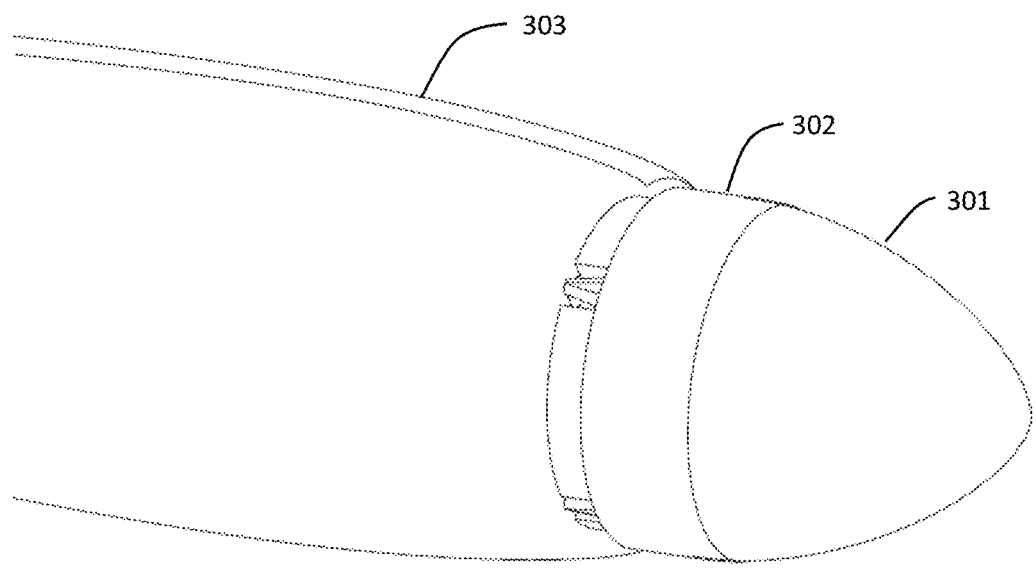
FIG. 3A is a partial cutaway view of a nacelle and rotor according to some embodiments of the present invention.
Figure 3B:
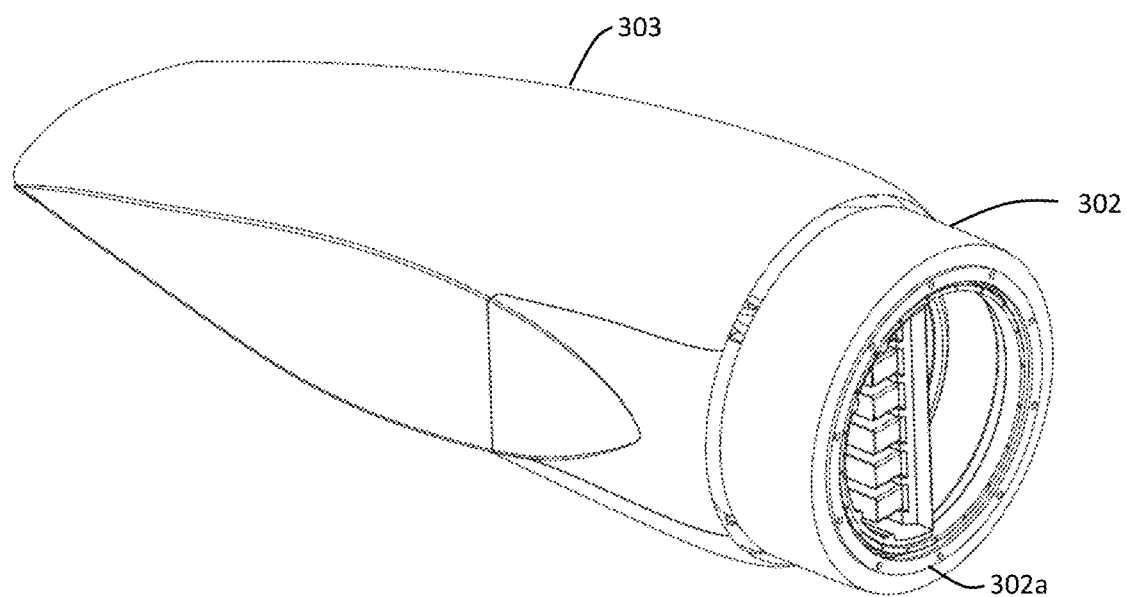
FIG. 3B is a partial cutaway view of a nacelle and rotor according to some embodiments of the present invention.

FIG. 3A illustrates, in partial view, a nacelle 303 which provides aerodynamic cover for support structure for a motor driven rotor assembly according to some embodiments of the present invention. A spinner, or cowling, 301 is mounted forward of the rotor 302 (blades not shown in this view). FIG. 3B is a drawing of a nacelle 303 showing the rotor with some other portions omitted for clarity. FIG. 3B illustrates the rotor 302 of the motor including a front mounting surface 302a, which is adapted to be coupled to and support the propeller hub. In this view, the propeller, the propeller hub, and other components are omitted for clarity of view of the rotor of the motor, and its forward mounting surface. In this illustrative embodiment, the motor rotor 302 rotates around an internal motor stator. In some aspects, the nacelle may be a multi-piece nacelle adapted to allow for the forward portion of the nacelle to transition from a forward facing horizontal configuration to a vertical take-off and landing configuration with the use of an internally mounted deployment mechanism. In some aspects, the nacelle may be a wingtip mounted nacelle which is adapted to transition between a horizontal and vertical flight configuration by rotating around a central pivot.

Figure 4:
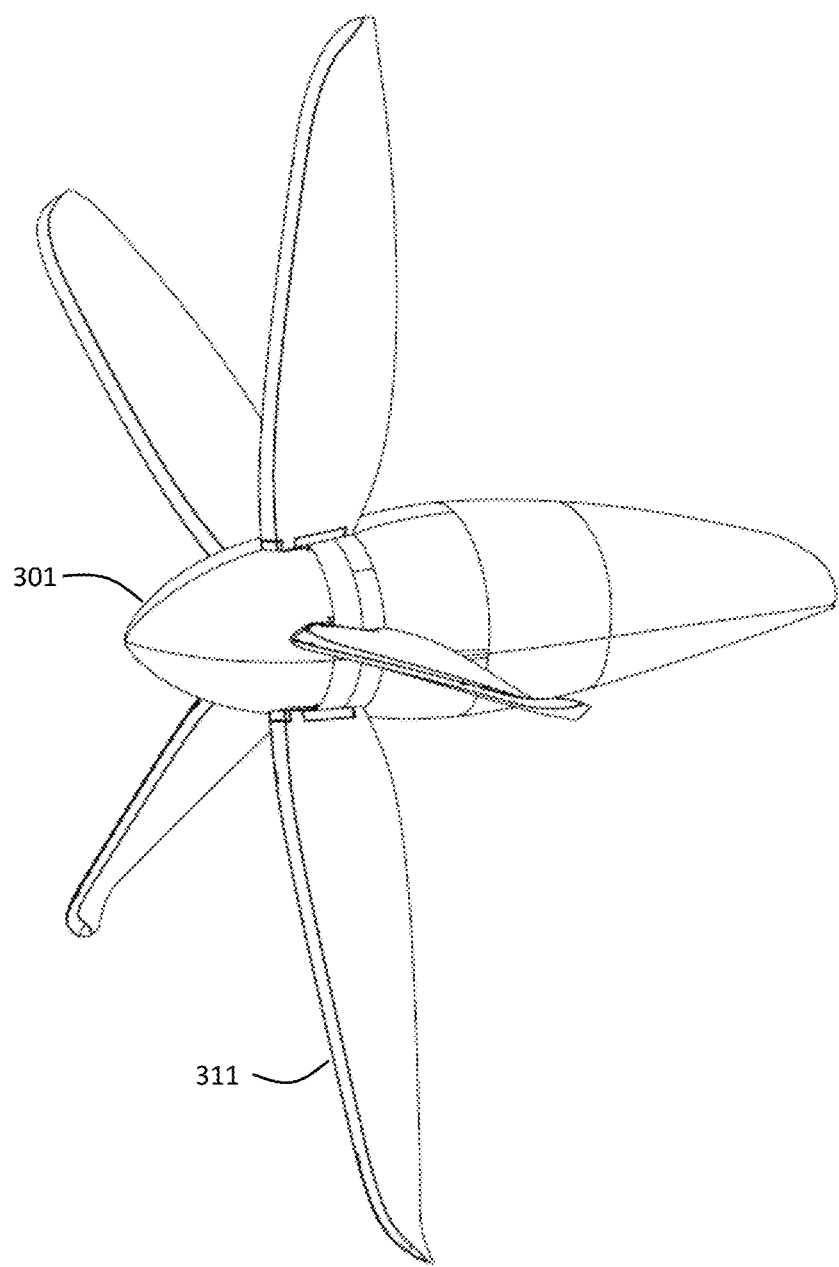
FIG. 4 is a view of a nacelle and rotor assembly according to some embodiments of the present invention.
Figure 5A:
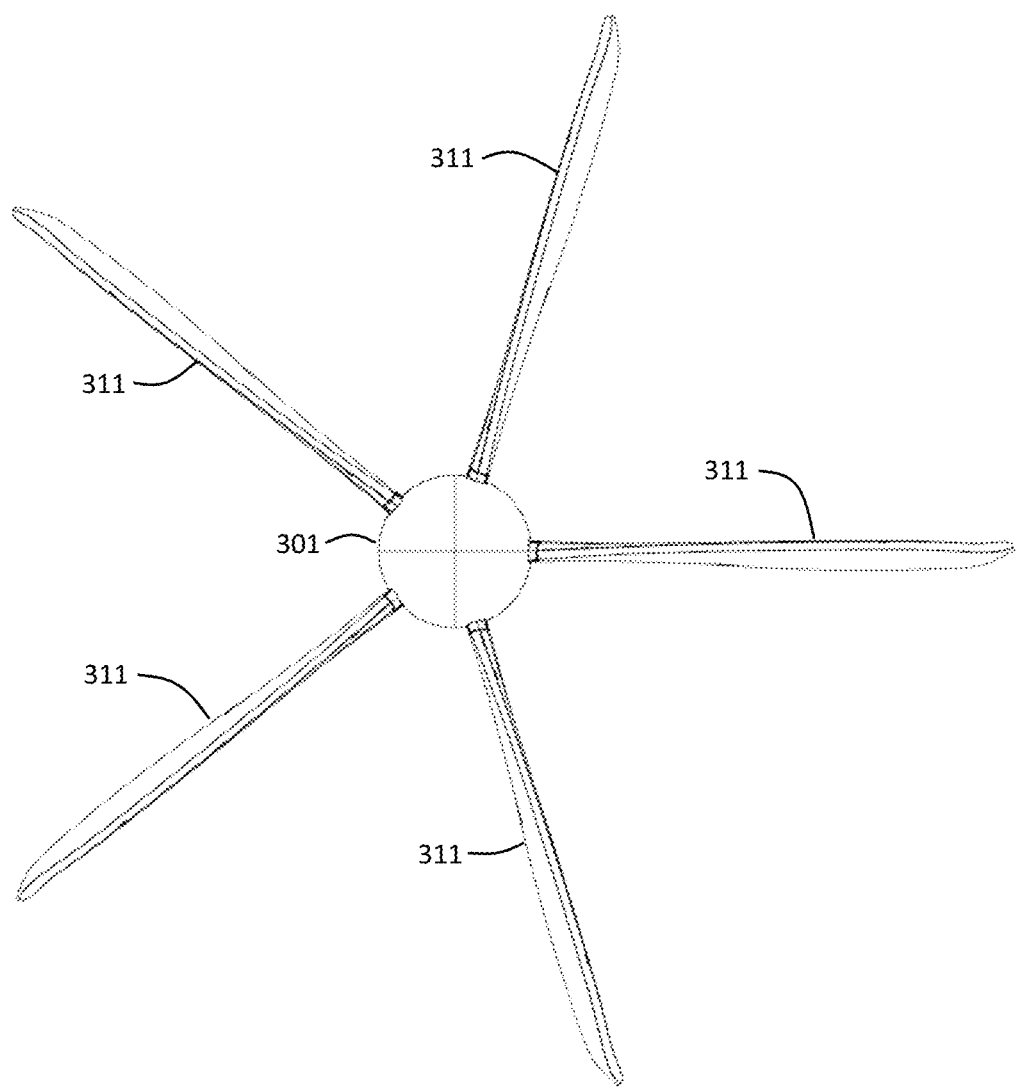
FIG. 5A is a front view of a rotor assembly according to some embodiments of the present invention.
Figure 5B:
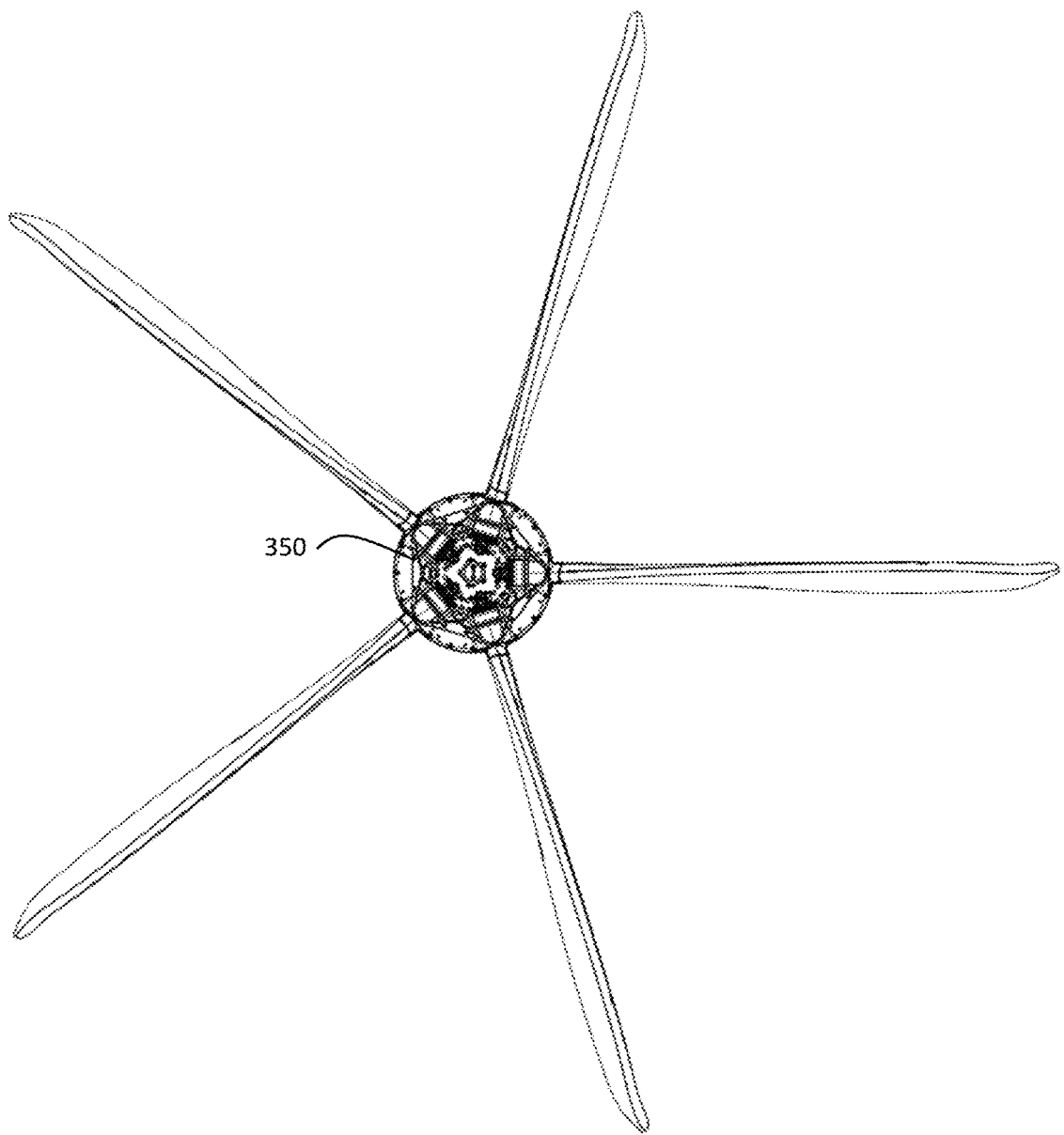
FIG. 5B is a front view of a rotor assembly with the spinner removed according to some embodiments of the present invention.
Figure 5C:
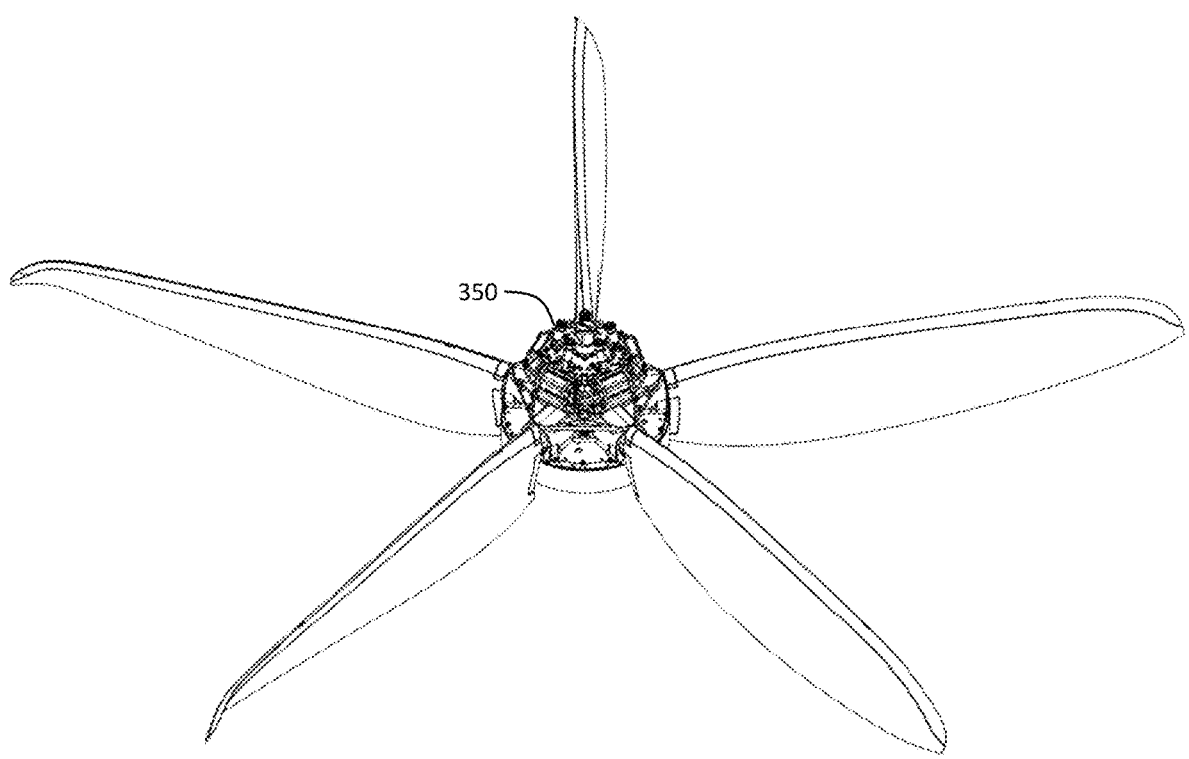
FIG. 5C is a perspective view of a rotor assembly with the spinner removed according to some embodiments of the present invention.

FIG. 4 illustrates a rotor assembly according to some embodiments of the present invention. In this illustrative embodiment, the propeller, with its five blades 311, and spinner 301 are coupled to the rotating structure and reside forward of the nacelle. A deployment mechanism is adapted to pivot the rotor assembly from a forward flight configuration to a vertical take-off and landing configuration. FIG. 5A illustrates a front view of a rotor assembly according to some embodiments of the present invention. In this illustrative embodiment, the propeller, with its five blades 311, and cowling 301 are coupled to the rotating structure and reside forward of the nacelle. FIG. 5B illustrates a front view of a rotor assembly with the spinner omitted for clarity, exposing a propeller blade pitch control system 350 according to some embodiments of the present invention. FIG. 5C further illustrates an oblique view of a rotor assembly with the spinner omitted for clarity, exposing a propeller blade pitch control system 350 according to some embodiments of the present invention.

In some embodiments of the present invention, as seen in FIGS. 6-9, and in conjunction with the representative aircraft embodiments discussed above, a propeller blade pitch angle control mechanism 350 is adapted to adjust the pitch angle of a plurality of propellers coupled to a propeller hub. FIG. 6A illustrates a top view of a five bladed 311 propeller coupled to a propeller hub 312. A pitch plate 329 is coupled to the propeller hub 312 with a plurality of pitch control bar linkages 319. The bar linkages 319 are pivotally coupled to the propeller hub 312 on a first end, and are pivotally coupled to the pitch plate 329 on a second end. A plurality of expansion units 328 are coupled to the propeller hub 312 on a first end, and are coupled to the pitch plate 329 on a second end. In this illustrative embodiment, there are five propeller blades 311, five scissor linkages 319, and five expansion units 328, which may be springs or gas springs, for example. An upper end of the pitch control extension unit 310 is seen centrally located on the pitch plate 329. An aspect of the coupling of the pitch plate to the propeller hub is that pitch plate moves only along the extension axis, with no transverse motion, and no rotation around any axis. Although illustrated with five scissor linkages, it is understood that there must be a minimum of two scissor linkages to function, and at least three scissor linkages to maintain mass balance of the propeller as the blades pitch.

Figure 6A:
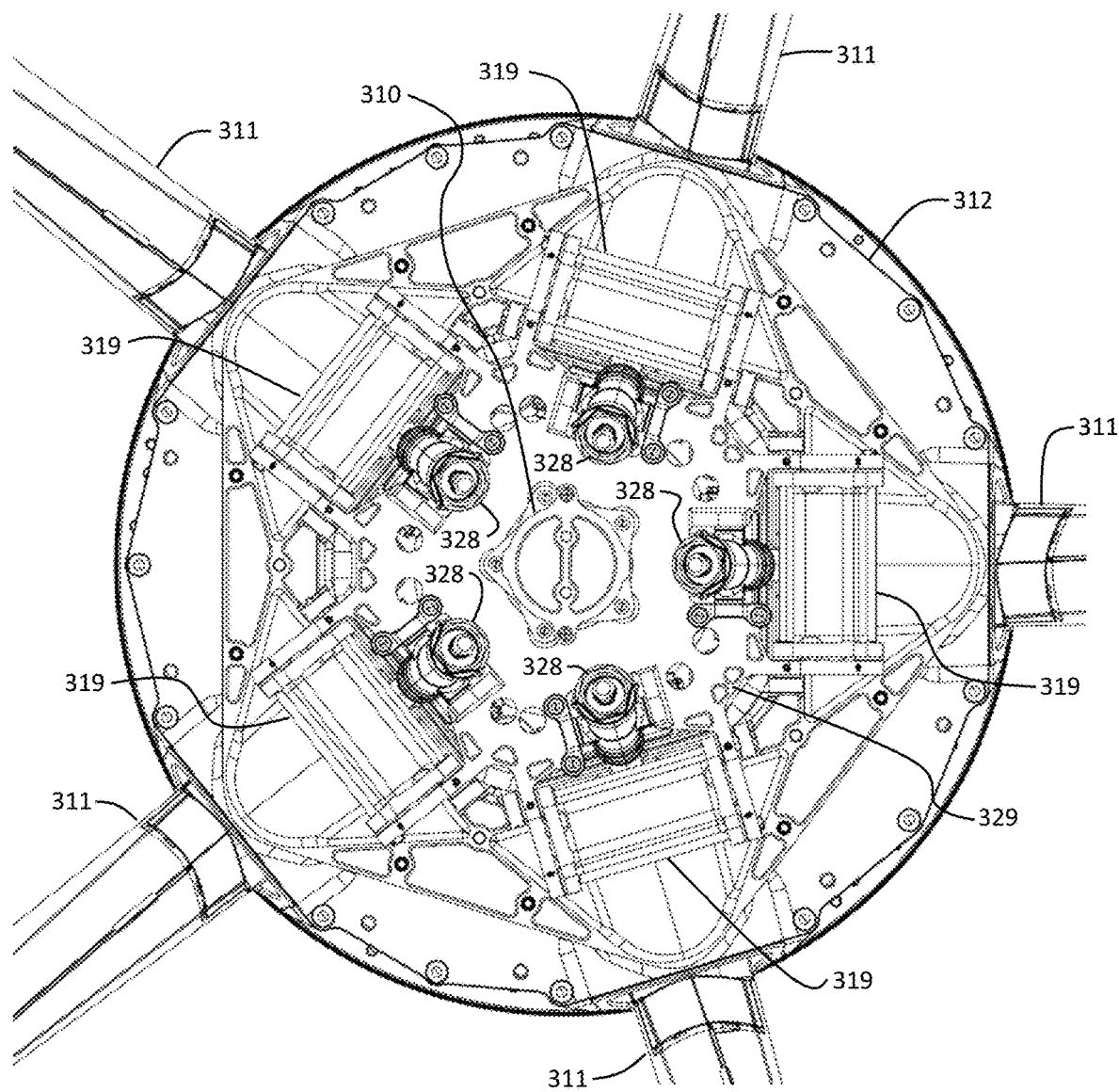
FIG. 6A is a front view of a rotor hub with a blade pitch control mechanism according to some embodiments of the present invention.
Figure 6B:
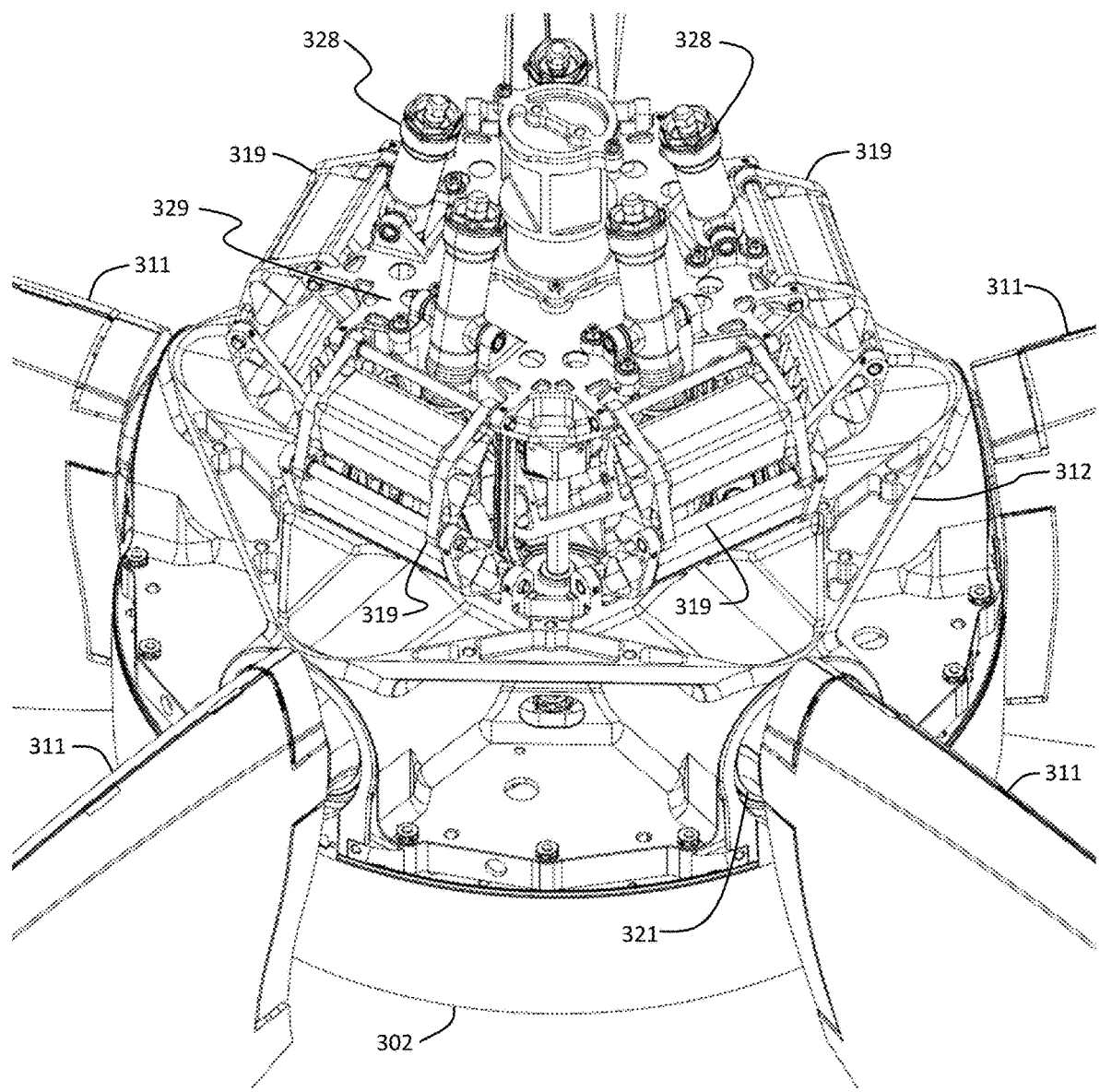
FIG. 6B is a perspective view of a rotor hub with a blade pitch control mechanism according to some embodiments of the present invention.
Figure 6C:
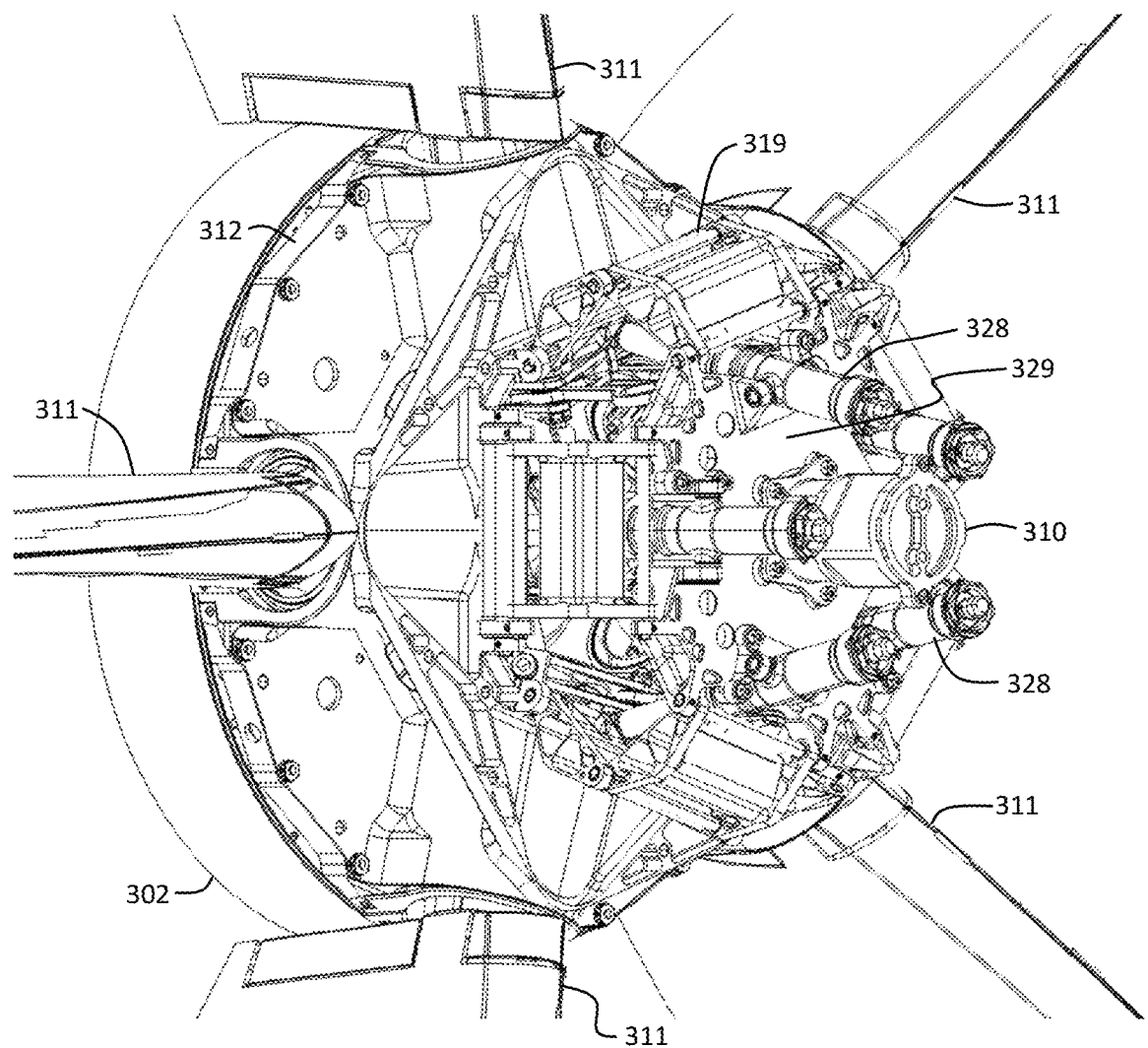
FIG. 6C is a perspective view of a rotor hub with a blade pitch control mechanism according to some embodiments of the present invention.

FIGS. 6B and 6C illustrate further oblique views of the propeller blade pitch angle control mechanism 350 according to some embodiments of the present invention. At the inner end of the propeller blades 311 is a blade root 321 which extends into the propeller hub 312. The pitch plate 329 is seen above the propeller hub 312, and the pitch plate is coupled to the propeller hub with a plurality of linkages 319. Although illustrated herein as two-bar linkages with pivot connections to both the propeller hub and the pitch plate, other couplings that constrain the pitch plate rotationally and which limit the motion of the pitch plate to movement away from propeller hub along a single axis may also be used. The propeller hub 312 coupled to the motor rotor 302. In some aspects, the propeller hub may be directly coupled to the motor rotor. In some aspects, there may be an intermediate structure between the propeller hub and the motor rotor. In some aspects, the propeller hub is directly coupled to mounting features on the motor rotor of an outrunner electric motor. The pitch control extension unit 310 is coupled to the pitch plate 329 and is adapted to move and control the position of the pitch plate relative to the propeller hub.

Figure 7:
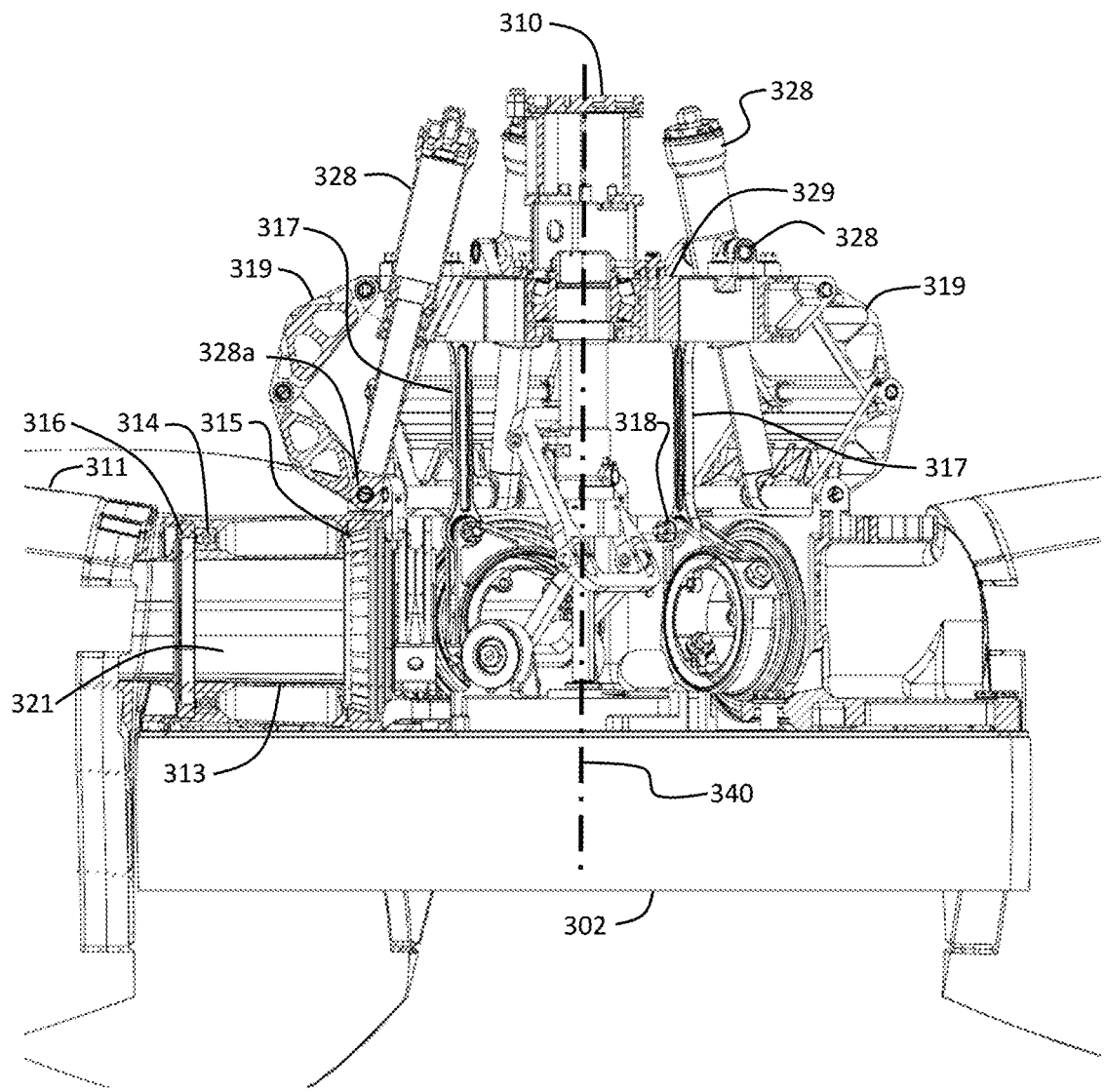
FIG. 7 is a partial cutaway side view perspective view of a rotor hub with a blade pitch control mechanism according to some embodiments of the present invention.

FIG. 7 illustrates the propeller blade pitch angle control mechanism 350 in partial cutaway view. The propeller blade 311 has a blade root 321 which is rotationally coupled to the propeller hub 312. The propeller 311 may be of composite material, such as a carbon fiber composite. The propeller blade root 321 may have a sleeve 313 around its outer periphery. In some aspects, the sleeve 313 may be of metal. In some aspects, the sleeve 313 may be of titanium. The sleeve 313 may be rotationally coupled to the propeller hub 312 with an outboard root bearing 314 and an inboard root bearing 315. A preload device 316 may be used to provide axial preload to the two bearing system. A control cam 318 may be fixedly coupled to an inboard end on the blade root 321, and may be coupled to the root sleeve 313. A pitch control link 317 may be coupled to the pitch plate 329 on a first end, and coupled to the control arm 318 on a second end. Both ends of the pitch control link may be pivotally coupled. In an illustrative example, both ends of the pitch control link are coupled using spherical bearings. The bar linkages 319 are pivotally coupled to the propeller hub 312 on a first end, and pivotally coupled to the pitch plate 329 on a second end. The bar linkage may also include a pivot coupling the two bars of the linkage. The bar linkages constrain the motion of the pitch plate 329 to movement along the extension axis 340. The bar linkages prevent rotation of the pitch plate 329 relative to the propeller hub 312. The extension axis 340 may be parallel to or coaxial with the spin axis of the propeller in some aspects. The motion of the pitch plate 329 along the extension axis 340 will then raise and lower the pitch control links 317, which will in turn then rotate the propeller blades 311 as the control arm, or bell crank 318, provides rotation input into the blade root 321. As will be discussed further below, the pitch control extension unit 310 drives the pitch plate 329 up and down relative to the propeller hub 312, thereby controlling the blade pitch angle of all of the propeller blades 311 using a single drive unit. The expansion units 328 are adapted to raise the pitch plate in the event of a failure of pitch control extension unit 310, or other failure types. The expansion units 328 may be gas filled cylinders in some aspects. The immediate movement of the propeller blades to a position such as that seen in FIG. 5A, for example, allows for the blades to feather through the air as opposed to providing a large drag in the case of extensive failure in the pitch mechanism or of the rotor assembly itself. The aircraft may not be able to maintain attitude control should the blades be in a low pitch position in the case of such a failure.

In an illustrative embodiment the propeller blades will have 80 degrees of blade pitch control. In some aspects, the propeller blade pitch angle control mechanism 350 will have in the range of 70-90 degrees of blade pitch control. In some aspects, the propeller blade pitch angle control mechanism will have greater than 70 degrees of blade pitch control. In some aspects, the propeller blade pitch angle control mechanism will have greater than 80 degrees of blade pitch control. In an illustrative example, the blades will have pitch control in the range of −10 degrees of pitch to +80 degrees of pitch. In an illustrative example, the blades will have twist along their span, and the pitch will be measure at the ¾ span location.

Figure 8:
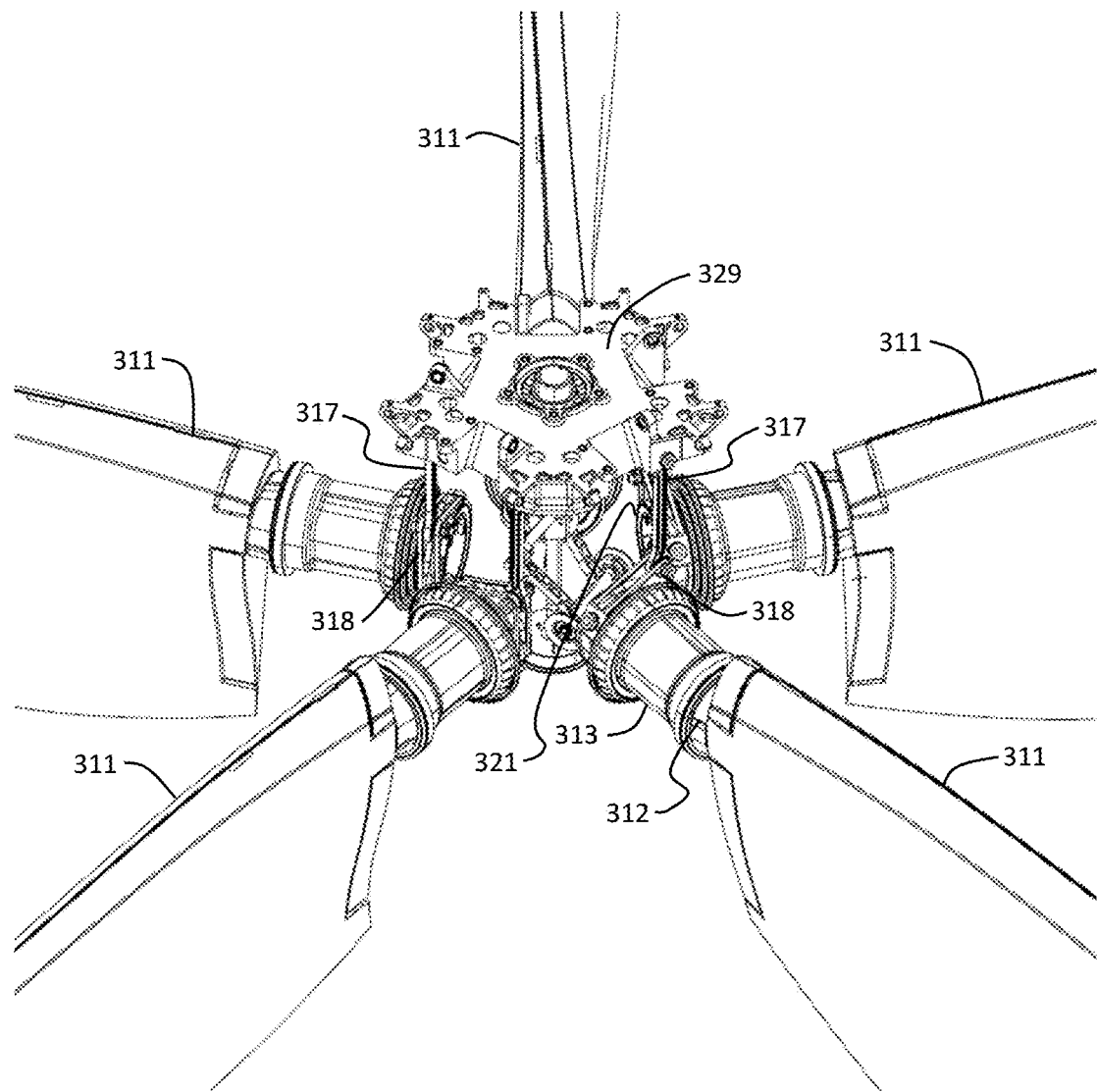
FIG. 8 is a perspective view of some components of a blade pitch control mechanism according some embodiments of the present invention.

FIG. 8 further illustrates a propeller blade pitch control system according to some embodiments of the present invention, with more parts omitted for clarity. The propeller blade 311 has a blade root 321 which is rotationally coupled to the propeller hub 312. The propeller blade root 321 may have a sleeve 313 around its outer periphery. A control cam 318 may be fixedly coupled to an inboard end on the blade root 321, and may be coupled to the root sleeve 313. A pitch control link 317 may be coupled to the pitch plate 329 on a first end, and coupled to the control cam 318 on a second end.

Figure 9:
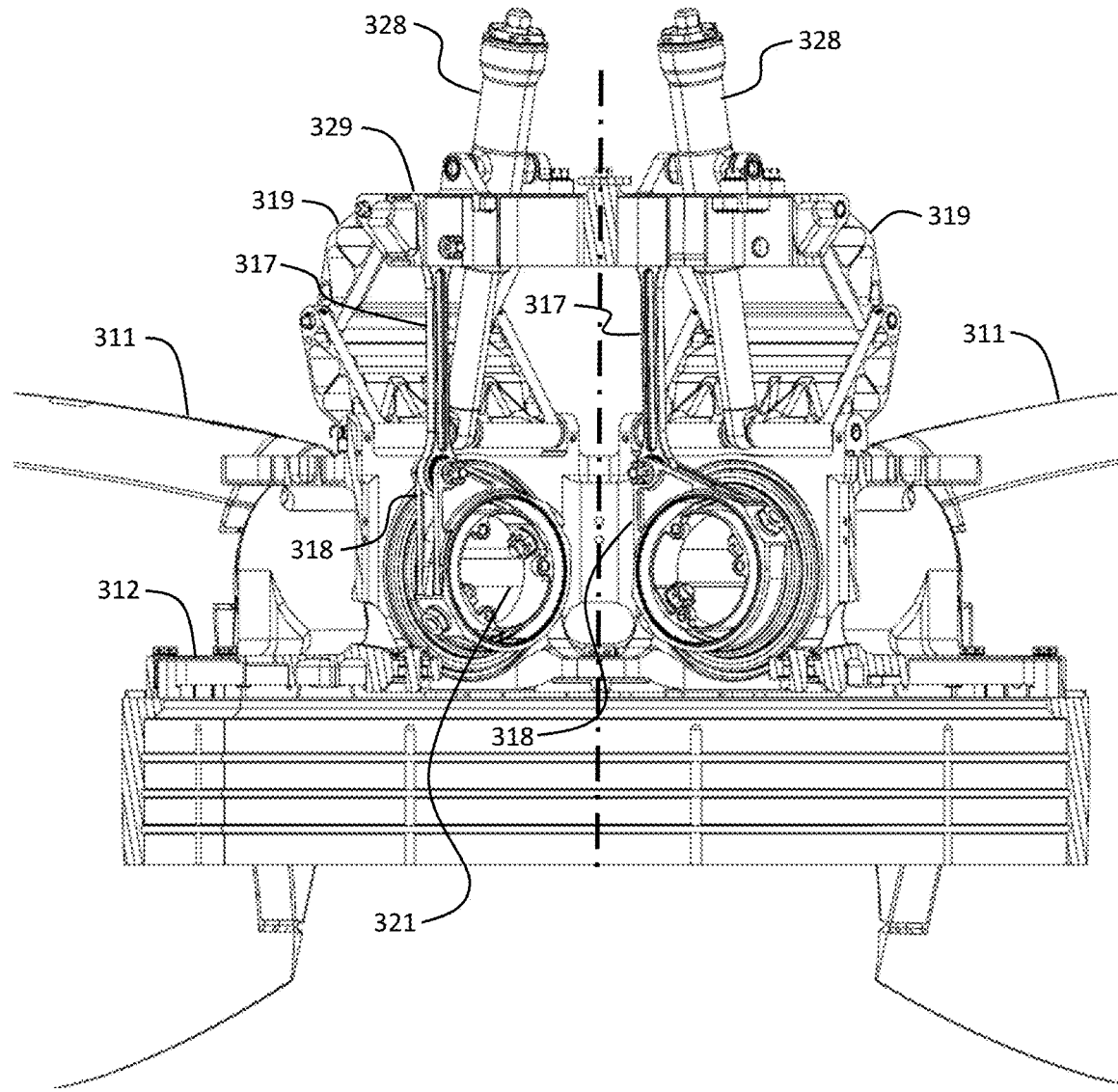
FIG. 9 is a partial cutaway view of a blade pitch control mechanism according to some embodiments of the present invention.

FIG. 9 illustrates a propeller blade pitch control mechanism in partial view according to some embodiments of the present invention. The propeller blade 311 has a blade root 321 which is rotationally coupled to the propeller hub 312. The propeller blade root 321 may have a sleeve 313 around its outer periphery. A control cam 318 may be fixedly coupled to an inboard end on the blade root 321, and may be coupled to the root sleeve 313. A pitch control link 317 may be coupled to the pitch plate 329 on a first end, and coupled to the control cam 318 on a second end. The expansion units 328 are adapted to raise the pitch plate in the event of a failure of pitch control extension unit 310, or other failure types. The expansion units 328 may be gas filled cylinders in some aspects. The expansion units 328 are adapted to prevent blade flattening in the event of a failure.

Figure 10A:
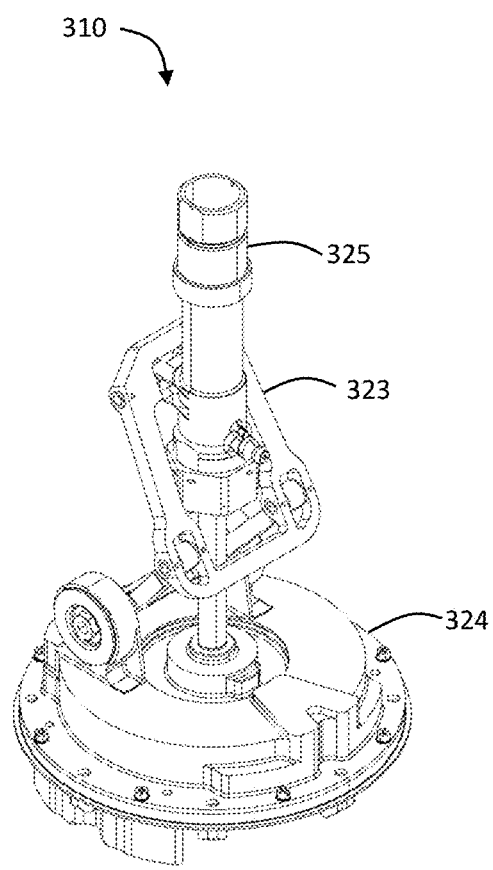
FIG. 10A is a perspective view of a drive for a blade pitch control mechanism according to some embodiments of the present invention.
Figure 10B:
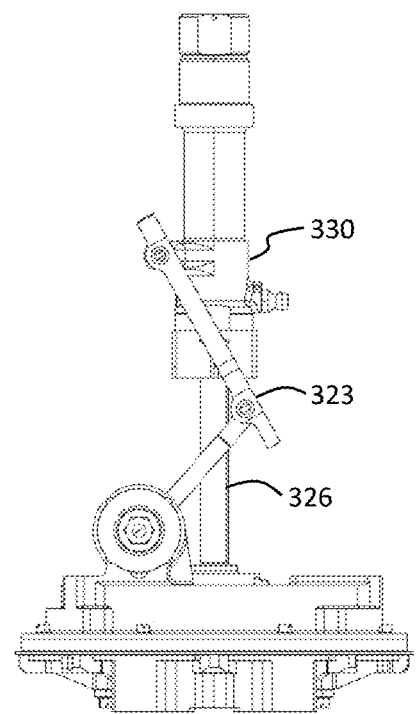
FIG. 10B is a side view of a drive for a blade pitch control mechanism according to some embodiments of the present invention.
Figure 10C:
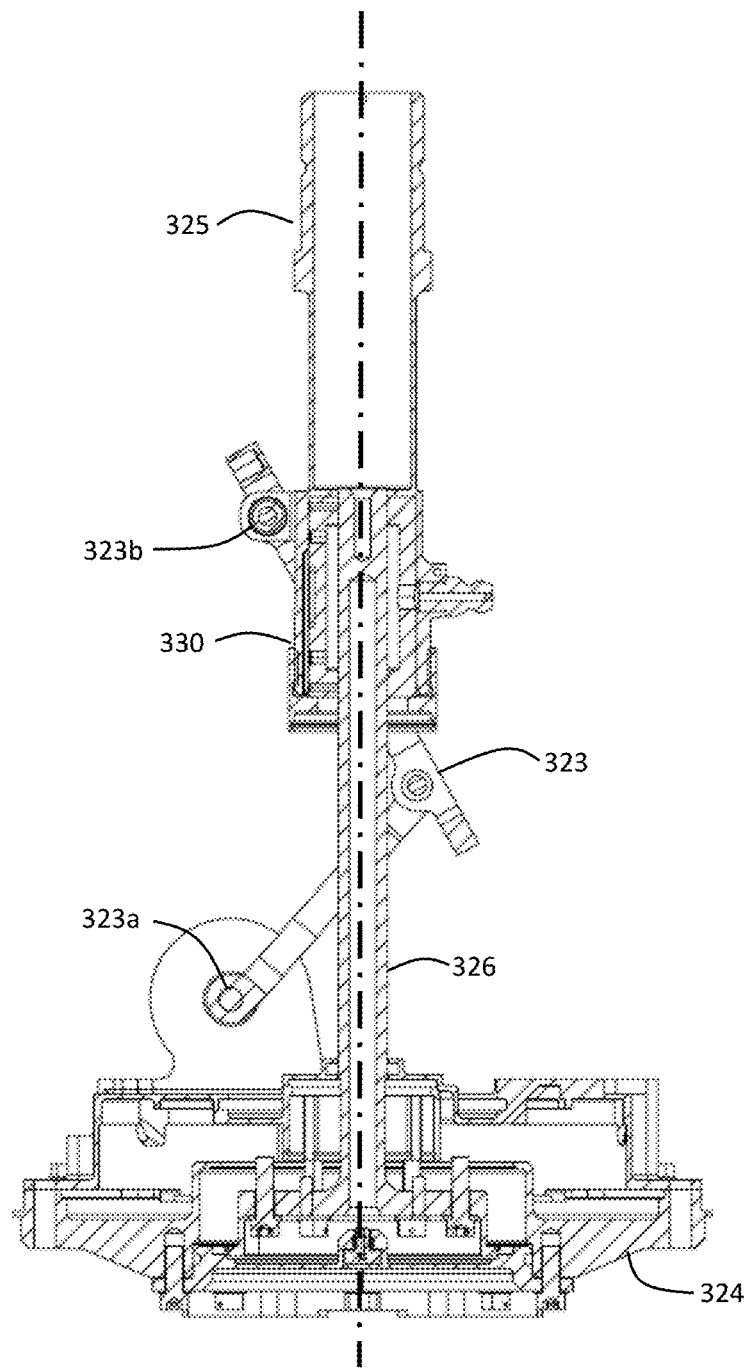
FIG. 10C is a cutaway view of side view of a drive for a blade pitch control mechanism according to some embodiments of the present invention.

FIGS. 10A-C illustrate the pitch control extension unit 310 according to some embodiments of the present invention. In some embodiments, a scissor mechanism 323 is coupled on a first end 323a to a base 324 and to a drive unit 330 on a second end 323b. A power screw 326 is rotationally driven by a motor in the base 324, and this rotational motion becomes linear motion along the extension axis at the drive unit 330. An upper end 325 of the pitch control extension unit 310 is coupled to the pitch plate and is adapted to raise and lower the pitch plate. The base 324 is fixedly coupled to a non-rotating portion of the rotor assembly, which may be a portion of the stator housing of the rotor motor. In some aspects, the drive unit comprises recirculating planetary rollers driven by a lead screw. In some aspects, the motor within the base 324 is a brushless AC inrunner motor. In some aspects, the motor is a dual wound, three phase motor that operates in the range of 450-750 Volts.

Figure 11:
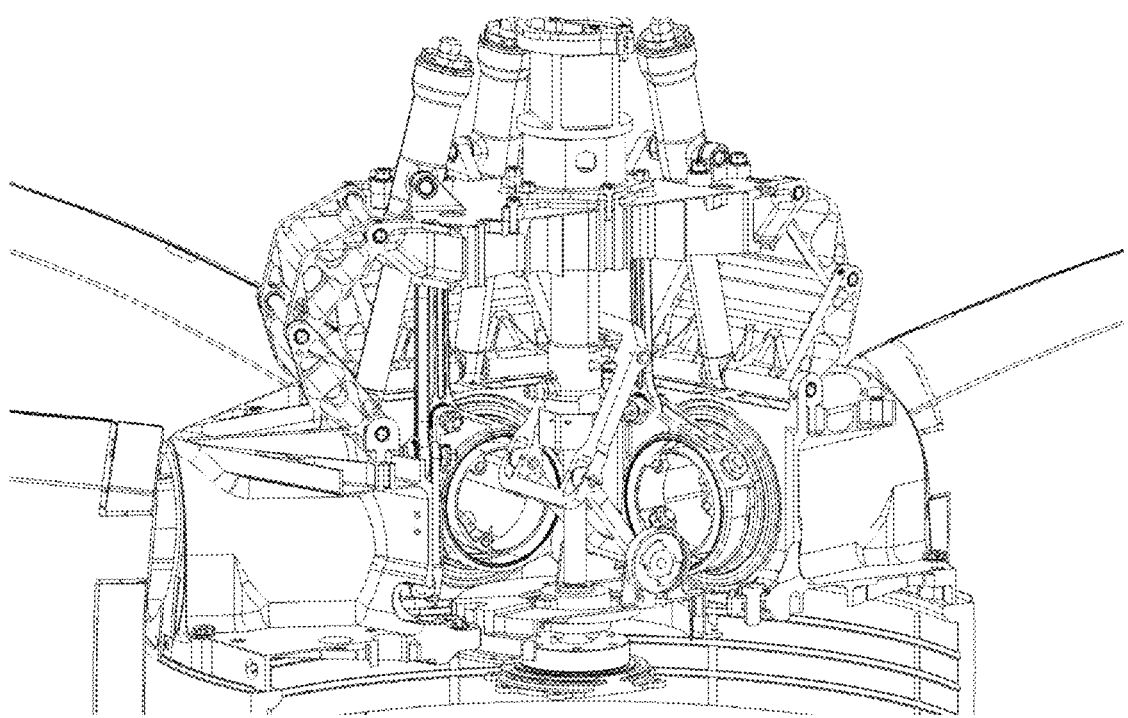
FIG. 11 is a partial cutaway view of a blade pitch control mechanism according to some embodiments of the present invention.

FIG. 11 further illustrates a propeller blade pitch control mechanism according to some embodiments of the present invention.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A propeller blade pitch control system, said system comprising:
   a propeller hub, said propeller hub comprising a spin axis;
   a plurality of propeller blades rotationally coupled to said propeller hub, each propeller blade comprising a blade root and a rotation cam at an inner end of said blade root;
   a pitch plate, said pitch plate extendably coupled to said propeller hub, said pitch plate configured to be extended closer to or further from said propeller hub, wherein said pitch plate is coupled to said propeller hub with a plurality of scissor linkages, said scissor linkages pivotally coupled to said propeller hub on a first end, said scissor linkages pivotally coupled to said pitch plate on a second end; and
   a plurality of pitch control links, said pitch control links coupled to said pitch plate on a first end, said control links coupled to a corresponding rotation cam on a second end.

2. The propeller blade pitch control system of claim 1 further comprising a pitch control extension unit, said pitch control extension unit coupled to said propeller hub on a first end of said pitch control extension unit, said pitch control extension unit coupled to said pitch plate on a second end of said pitch control extension unit, said pitch control extension unit configured to extend or retract said pitch plate from or towards said propeller hub in a direction parallel to said spin axis, said pitch control extension unit comprising an electric drive motor and a linear power screw.

3. The propeller blade pitch control system of claim 2 further comprising one or more expansion units, said expansion units coupled to said propeller hub on a first end, said expansion units coupled to said pitch plate on a second end.

4. The propeller blade pitch control system of claim 3 wherein said expansion units are configured to extend said pitch plate from said propeller hub in an event of a failure of said pitch control extension unit, wherein said propeller blades would be placed in a pitch angle such that the propeller blades feather through air when an air flow is incoming along said spin axis.

5. The propeller blade pitch control mechanism of claim 3 wherein said one or more expansion units are gas filled cylinders.

6. The propeller blade pitch control system of claim 1 further comprising one or more expansion units, said expansion units coupled to said propeller hub on a first end, said expansion units coupled to said pitch plate on a second end.

7. The propeller blade pitch control system of claim 6 wherein said plurality of scissor linkages comprises three or more scissor linkages.

8. The propeller blade pitch control mechanism of claim 6 wherein said one or more expansion units are gas filled cylinders.

9. The propeller blade pitch control system of claim 1 wherein said plurality of scissor linkages comprises three or more scissor linkages.

10. A propeller blade pitch control system, said system comprising:
   a propeller hub, said propeller hub comprising a spin axis;
   a plurality of propeller blades rotationally coupled to said propeller hub, each of said propeller blades comprising a blade root and a rotation cam at an inner end of said blade root;
   a pitch plate, said pitch plate extendably coupled to said propeller hub, said pitch plate configured to be extended closer to or further from said propeller hub, wherein said pitch plate is coupled to said propeller hub with a plurality of scissor linkages, said scissor linkages pivotally coupled to said propeller hub on a first end, said scissor linkages pivotally coupled to said pitch plate on a second end;
   a plurality of pitch control links, each of said pitch control links coupled to said pitch plate on a first end, each of said pitch control links coupled to said rotation cams on a second end; and
   a pitch control extension means, said pitch control extension means coupled to said propeller hub on a first end of said pitch control extension means, said pitch control extension means coupled to said pitch plate on a second end of said pitch control extension means, said pitch control extension means configured to extend or retract said pitch plate from or towards said propeller hub in a direction parallel to said spin axis.

* * * * *